(12) United States Patent
Kerselaers et al.

(10) Patent No.: US 10,292,031 B1
(45) Date of Patent: May 14, 2019

(54) WIRELESS NETWORK DEVICE

(71) Applicant: NXP B.V., Eindhoven (NL)

(72) Inventors: Anthony Kerselaers, Herselt (BE); Liesbeth Gommé, Anderlecht (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/883,838

(22) Filed: Jan. 30, 2018

(51) Int. Cl.
*H04B 7/00* (2006.01)
*H04W 4/80* (2018.01)
*H04B 5/00* (2006.01)
*H04B 13/00* (2006.01)

(52) U.S. Cl.
CPC ............ *H04W 4/80* (2018.02); *H04B 5/0031* (2013.01); *H04B 13/005* (2013.01)

(58) Field of Classification Search
CPC ...... H04W 4/80; H04B 5/0006; H04B 5/0031
See application file for complete search history.

(56) References Cited

U.S. PATENT DOCUMENTS

| 8,531,337 | B2 | 9/2013 | Soler Castany et al. |
| 9,363,098 | B2 | 6/2016 | Hamida et al. |
| 2007/0071149 | A1 | 3/2007 | Li et al. |
| 2017/0111834 | A1* | 4/2017 | Belverato ............ H04B 5/0006 |
| 2017/0171046 | A1* | 6/2017 | Flood .................... H04B 1/385 |
| 2017/0265025 | A1* | 9/2017 | Deck ...................... H04L 43/16 |
| 2017/0366924 | A1 | 12/2017 | Thoen |

* cited by examiner

*Primary Examiner* — Tuan Pham

(57) ABSTRACT

One example discloses a wireless network device, wherein the wireless device is a second wireless device configured to receive a set of original signal transmissions from a first wireless device; wherein the set of original signal transmissions includes a signal for the second wireless device and a signal for a third wireless device; wherein the second wireless device is configured to detect a timing interval between individual signal transmissions within the set of original signal transmissions; wherein the second wireless device is configured to re-transmit the signal for the third wireless device substantially in-phase with the timing interval.

19 Claims, 4 Drawing Sheets

WIRELESS NETWORK DEVICE

The present specification relates to systems, methods, apparatuses, devices, articles of manufacture and instructions for wireless networking.

SUMMARY

According to an example embodiment, a wireless network device, wherein the wireless device is a second wireless device configured to receive a set of original signal transmissions from a first wireless device; wherein the set of original signal transmissions includes a signal for the second wireless device and a signal for a third wireless device; wherein the second wireless device is configured to detect a timing interval between individual signal transmissions within the set of original signal transmissions; wherein the second wireless device is configured to re-transmit the signal for the third wireless device substantially in-phase with the timing interval.

In another example embodiment, the second wireless device is configured to also receive a re-transmitted version of the signal for the second wireless device directly from the third wireless device and substantially in-phase with the timing interval.

In another example embodiment, the second wireless device is configured to sum the signals for the second wireless device received from both the first wireless device and the third wireless device.

In another example embodiment, the signals received from the first wireless device and the third wireless device have different signal path lengths.

In another example embodiment, the signals received from the first wireless device and the third wireless device have different signal strengths.

In another example embodiment, the signal strengths of the signals received from the first wireless device and the third wireless device reinforce each other since the signals are substantially in-phase with each other.

In another example embodiment, the second wireless device is configured to sum the signals using only one receiver.

In another example embodiment, the second wireless device is configured to sum the signals using only one antenna.

In another example embodiment, the second wireless device is configured to sum the signals by summing a signal strength of each the signals independent of the signals phase relationship.

In another example embodiment, the first, second and third wireless devices together form a body area network.

In another example embodiment, the second wireless device is embedded in at least one of: an earbud, a hearing aid, a wearable device, a smartphone, a laptop computer, or a smartwatch.

In another example embodiment, the signals received from both the first wireless device and the third wireless device carry a same set of data for the second wireless device.

In another example embodiment, the second wireless device is configured to decode the summed signals to obtain the set of data.

In another example embodiment, the set of data includes at least one of: audio data, video data, sensor data, media data, document data, text data, or road traffic data.

In another example embodiment, the re-transmission of the signal for the third wireless device occurs even if no errors are detected in the original signal transmission of the signal for the third wireless device.

In another example embodiment, the original and re-transmitted signals are NF-EMI signals.

In another example embodiment, the second wireless device is configured to re-transmit all of the original signals from the first device that are not for the second wireless device.

In another example embodiment, the second wireless device is configured to re-transmit all of the original signals received from the first device.

According to an example embodiment, a method of distributing instructions, stored on a non-transitory, tangible computer readable storage medium, for configuring a wireless network device, wherein the instructions include: receiving a set of original signal transmissions from a first wireless device; wherein the set of original signal transmissions includes a signal for the second wireless device and a signal for a third wireless device; detecting a timing interval between individual signal transmissions within the set of original signal transmissions; and re-transmitting the signal for the third wireless device substantially in-phase with the timing interval.

The above discussion is not intended to represent every example embodiment or every implementation within the scope of the current or future claim sets. The Figures and Detailed Description that follow also exemplify various example embodiments.

Various example embodiments may be more completely understood in consideration of the following Detailed Description in connection with the accompanying Drawings, in which:

Figure 1:
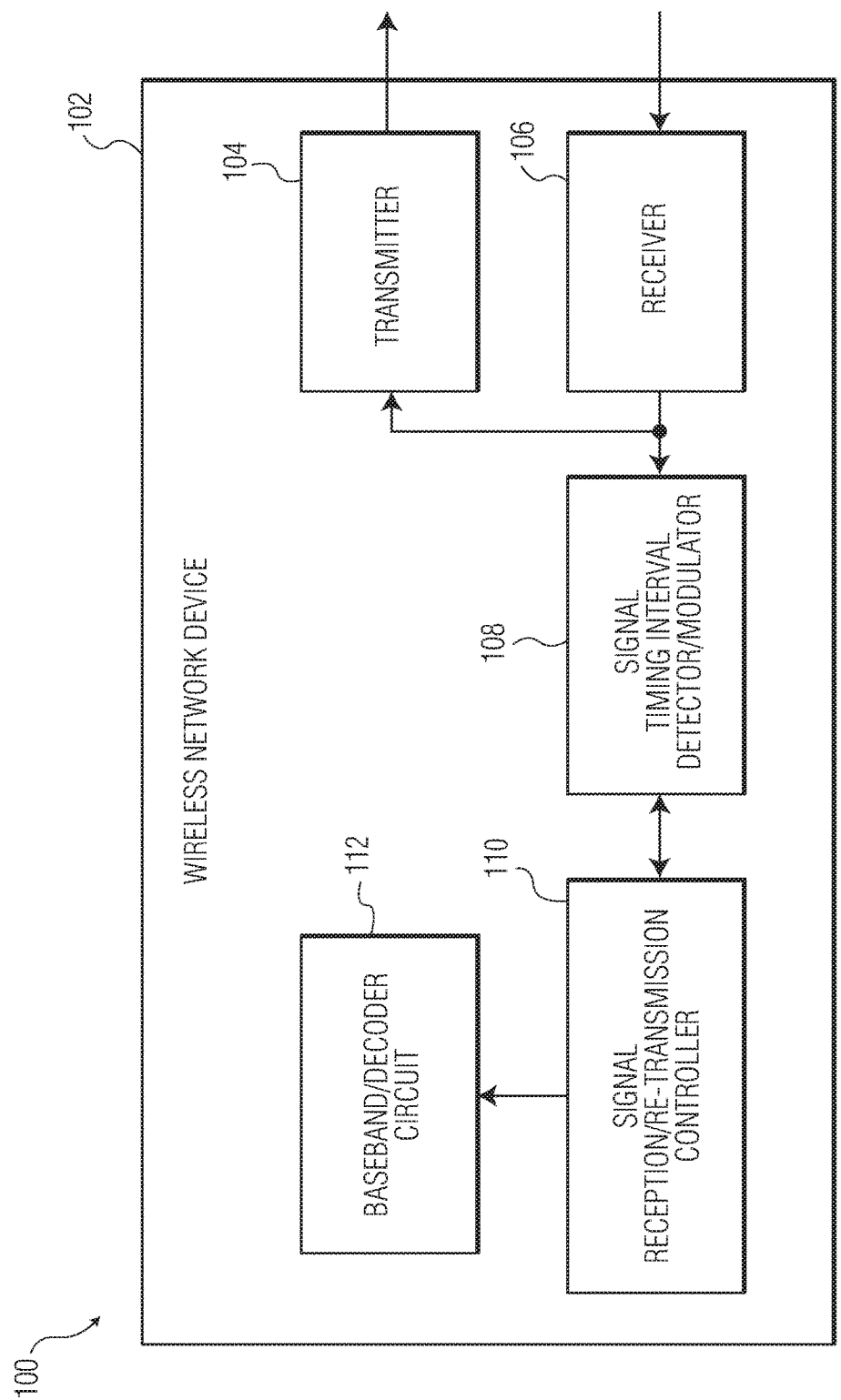
FIG. 1 is an example of a wireless network device.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Wireless wearable devices have served a variety of on-body communications functions. Earbuds, hearing aids, smartwatches, medical sensors and so on can be placed on a person to improve their quality of life. Other wireless devices may be placed on structures, machines, animals and the like and serve similar purposes.

In an example case of earbuds and hearing aids worn by a person, a combination of data and audio information is often communicated between the devices. The audio can be high quality audio, like CD quality or can be speech quality. Various communication bandwidths are required to support such wireless wearable device functions.

Some example wireless wearable devices may have additional off-body communications functions, such as communicating with other persons, cars and/or bicycles, or receiving road traffic communications, perhaps according to one or more Car2X standards.

Such wearable devices are preferentially small. If employing near-field communications, they are also small compared with a wavelength of the near field signals used. For example a typical earbud can be as small as 15 mm whereas a wavelength of a 10 MHz near field signal is 30 meters.

Since a minimal size of a resonant antenna is a half wavelength, a 10 MHz near-field antenna would have a length of at least 15 meters. Such an antenna size cannot fit in an earbud with a length of 15 mm.

Thus such small integrated antennas create very little planar radiating (i.e. RF) waves; however, such devices can communicate using magnetic and/or electric near fields whose signals bounded to the person's, structure's, or machine's body.

Pathlosses between such near-field wireless wearable devices however can vary greatly due to their different physical positions. For some devices the pathloss from another device is so high that a received or transmitted signal strength may be beneath a detection level of either device's receiver and thus no communication can occur between the devices.

FIG. 1 is an example 100 of a wireless network device 102. The wireless network device 102 includes a transmitter 104, a receiver 106, a signal timing interval detector/modulator 108, a signal reception/re-transmission controller 110, and a baseband/decoder circuit 112.

"Signals" are herein broadly defined to include substantially in-phase: data packets, audio data, video data, text, coded data, and other information streams. The signals may include analog data, digitally encoded data or both. Whenever example embodiments discussed below mention data packets, such examples also apply to signals. "Substantially" is herein defined to include phase variations whose effect on decoding the signals can be handled by the baseband/decoder circuit 112.

Figure 2:
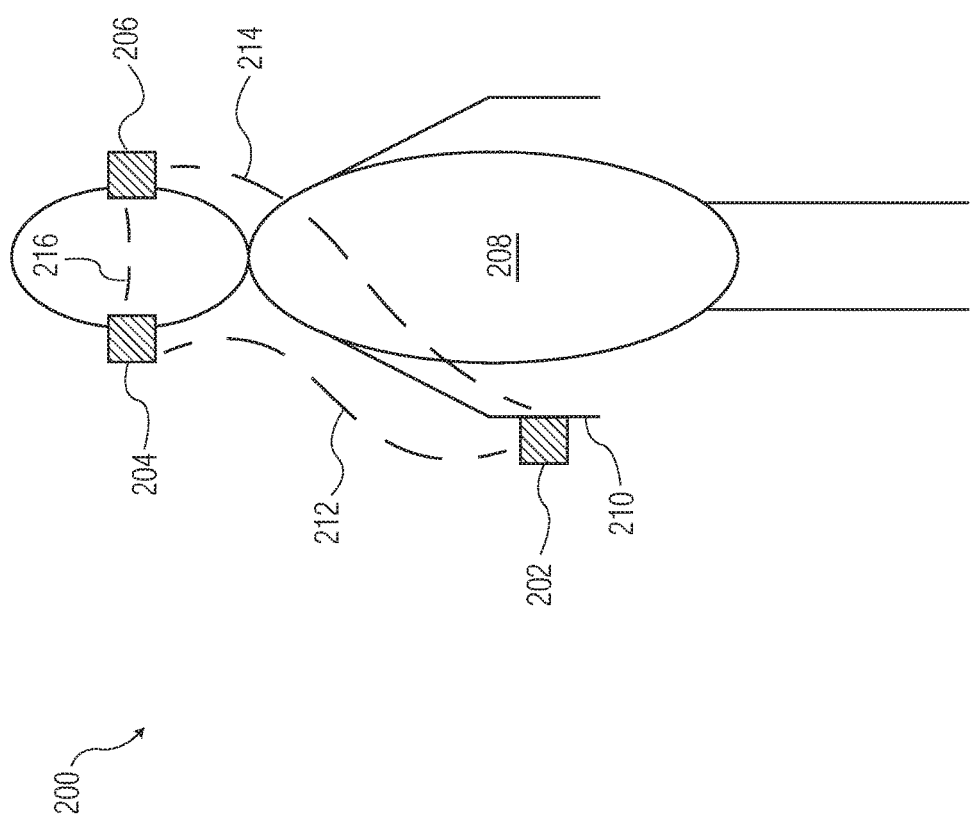
FIG. 2 is an example of a body area network.

FIG. 2 is an example of a body area network 200. The body area network 200 includes a first wireless device 202, a second wireless device 204, and a third wireless device 206. The first wireless device 202 in this example is positioned on a wrist 210 of a user 208. The second wireless device 204, and third wireless device 206 are earbuds or hearing aids worn on the user's 208 head. Signal path length 212, signal path length 214, and signal path length 216 are as shown.

While three wireless devices 202, 204, 206 are discussed, the body area network 200 can include any number of wireless devices and as the body area network 200 scales, the benefits of the discussion below similarly multiply. In some example embodiments, the wireless devices include wearable attached to the human body, and other wireless devices positioned within range of the in-phase signals.

FIG. 1 and FIG. 2 are now discussed together.

For the purposes of this example embodiment discussion, the wireless device 102 is a second wireless device 204, but the first and third wireless devices 202, 206 have similar components and functionality.

The second wireless device 204 is configured to receive (from the receiver 106) a set of original signal transmissions from the first wireless device 202. The set of original signal transmissions includes a signal for the second wireless device 204 and a signal for a third wireless device 206 (see FIGS. 3 and 4 for examples).

The second wireless device 204 is configured to detect a timing interval (e.g. 314 or 316 in FIG. 3) (as detected by the signal timing interval detector/modulator 108) between individual signal transmissions, or signal transmissions for a specific wireless device, within the set of original signal transmissions. The second wireless device 204 is configured to re-transmit (via the transmitter 104) the signal for the third wireless device 206 substantially in-phase with the timing interval (as modulated by the signal timing interval detector/modulator 108).

In some example embodiments the original and re-transmitted signals are on-body Near Field Electro-Magnetic Induction (NF-EMI) signals which by their nature are in-phase. Other in-phase signals could alternatively be used. In some other example embodiments, the wireless devices ensure that their signals are in-phase using a calibration process that accounts for the varying path lengths between the wireless devices.

Re-transmission of the signal for the third wireless device 206 occurs even if no errors are detected in the original signal transmission of the signal for the third wireless device 206.

The second wireless device 204 is also configured to receive a re-transmitted version of the signal for the second wireless device 204 directly from the third wireless device 206 and substantially in-phase with the timing interval (314 or 316).

The signals received from both the first wireless device 202 and the third wireless device 206 carry a same set of data for the second wireless device 204. The set of data includes at least one of: audio data, video data, sensor data, media data, document data, text data, or road traffic data, which is decoded by the baseband/decoder circuit 112 in the wireless network device 102.

The wireless devices 202, 204, 206 can be variously embedded in: an earbud, a hearing aid, a wearable device, a smartphone, a laptop computer, or a smartwatch.

The second wireless device 204 is then configured to sum the signals for the second wireless device 204 received from both the first wireless device 202 and the third wireless device 206. The second wireless device 204 is configured to decode the summed signals to obtain the set of data.

The signals received from the first wireless device 202 and the third wireless device 206 have different signal path lengths 212 and 216 respectively. Due to the difference in these signal path lengths 212, 216 and perhaps for other interference and/or noise reasons, the signals received from the first wireless device 202 and the third wireless device 206 have different signal strengths.

However, the signal strengths of the signals received from the first wireless device 202 and the third wireless device 206 reinforce each other since the signals are substantially in-phase. This reinforcement creates a more robust body area network 200.

Also due to the in-phase nature, the second wireless device 204 can sum the signals using only one receiver and/or one antenna.

Thus, the second wireless device 204 can sum the signals by summing a signal strength of each the signals without a need to check and/or adjust for any differences in the signals phase relationship.

Depending upon a protocol application, the second wireless device 204 can be configured to only re-transmit all of the original signals from the first device that are not for the second wireless device 204, or to re-transmit all of the original signals received from the first device. Thus the wireless devices 202, 204, 206 re-transmit data packets to each other concurrently. As a result, multiple signals are arriving substantially (e.g. quasi) in-phase with each other at the different wireless devices. Aggregating the in-phase signals results in a combined signal strength that in most communications is greater than any one transmitted signal.

The first wireless device 202 in this example embodiment is positioned at the wrist 210 of the user 208 and can be a smart watch. The first wireless device 202 may also contain a second off-body communication mode that allow communication by means of radiating (RF) planar waves.

This off-body communication mode can be at 2.5 GHz (e.g. Bluetooth low energy (BLE) frequency band). The off-body communication mode could alternately be a vehicle to anything (V2X) communication band which is 5.9 GHz in Europe and the US.

In example embodiments where the second wireless device 204 is a right earbud and the third wireless device 206 is a left earbud, both earbuds have functionality for receiving audio from the first wireless device 202 (e.g. smart watch).

In the example of FIG. 2, the signal path length 212 between the first wireless device 202 and the second wireless device 204 is shorter compared to the signal path length 214 between first wireless device 202 and the third wireless device 206. As a result, the received signal strength is stronger at second wireless device 204 compared with third wireless device 206. Thus, there may be conditions were the received signal strength by third wireless device 206 is barely larger than the receiver threshold and the connection between first wireless device 202 and the third wireless device 206 maybe broken or data throughput maybe be decreased.

However, by aggregating the in-phase signals from the first and second wireless devices 202, 204 the received signal strength at the third wireless device 206 other wireless device is increased, thereby bolstering each data packet transmission to the third wireless device 206, resulting in a more robust overall body network 200.

Figure 3:
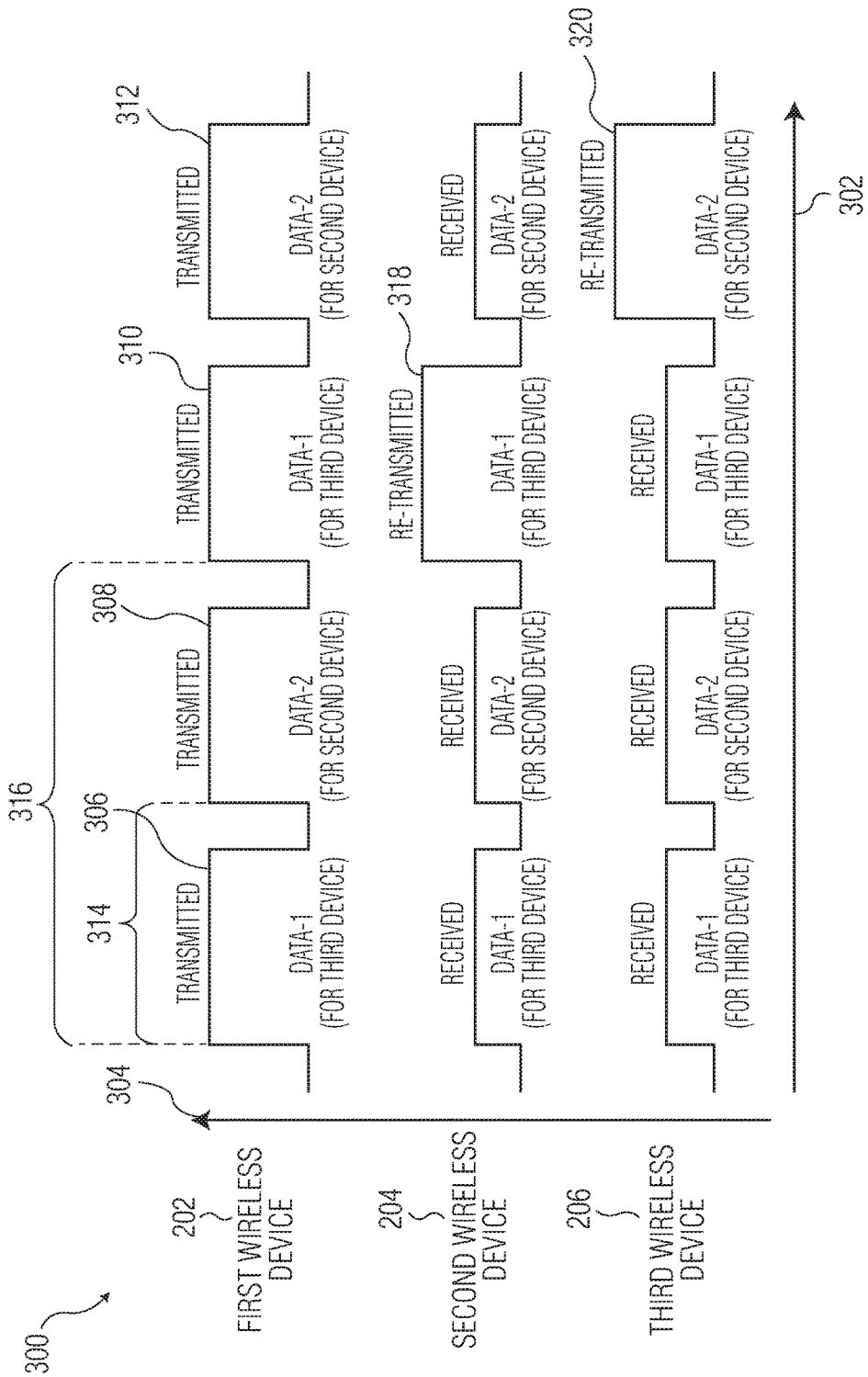
FIG. 3 is a first example signal strength and timing diagram of data packets being communicated between a set of wireless network devices.

FIG. 3 is a first example 300 signal strength and timing diagram of data packets being communicated between the set of wireless network devices 202, 204, 206. The first example 300 shows a time axis 302 and a signal strength axis 304. Data-1 transmissions for the third wireless device 206, and Data-2 for the second wireless device 204 are also shown.

The example 300 shows the first wireless device 202 generating a first transmission 306, a second transmission 308, a third transmission 310, and a fourth transmission 312.

A first timing-interval 314 is defined between subsequent transmissions 306, 308, 310, 312 regardless of their intended wireless device destination. A second timing-interval 316 is defined between subsequent transmissions 306, 310 having a same intended wireless device destination (i.e. they are both Data-1 packets).

In the example time segment shown in FIG. 3, the first wireless device 202 is transmitting and is an original source of data packets Data-1 and Data-2. Data-1 is intended primarily, if not completely, for the third wireless device 206 and Data-2 is intended primarily for the second wireless device 204.

The second wireless device 204 and the third wireless device 206 in this example need different packets but not both. Here the first wireless device 202 is a smartwatch and Data-1 represents a left audio channel data packet for the third wireless device 206, which is a left earbud, and Data-2 represents a right audio channel data packet for the second wireless device 204, which is a right earbud.

In this example time segment, Data-1 and Data-2 are transmitted by the first wireless device 202 twice. The second and third wireless devices 204, 206 both receive Data-1 and Data-2, however due to variances in their respective signal path lengths 212, 214 the signal strength of Data-1 and Data-2 for each is different.

Since the signal path length 214 from the first wireless device 202 to the third wireless device 206 is longer than the signal path length 212 from the first wireless device 202 to the second wireless device 204, it is possible that the second wireless device 204 can receive and process Data-1 whereas the third wireless device 206 cannot, due to differing signal strengths. Such path loss differences can be on the order of 5 to 10 dB.

Similarly, due perhaps to transitory interference, it is possible that the third wireless device 206 can receive and process Data-2 whereas the second wireless device 204 cannot.

The re-transmission protocol for increasing a robustness of the body area network 200 is now further discussed. While just three wireless device 202, 204, 206 are discussed, more wireless devices (not shown) can be added thereby further increasing the robustness of the network 200.

In a first re-transmission example, the second wireless device 204 receives the Data-1 signals 306, 310 from the first wireless device 202. The second wireless device 204 then re-transmits 318 Data-1. The third wireless device 206 receives both Data-1 signals (i.e. the third transmission 310 and re-transmit 318).

Since the signal path length 216 from the second wireless device 204 to the third wireless device 206 is much shorter, the third wireless device 206 will be able to receive and process Data-1 either wholly from the second wireless device's 204 re-transmit 318 of Data-1, or combined with the first wireless device's 202 third transmission 310 of Data-1.

In a second re-transmission example, the third wireless device 206 receives the Data-2 signals 308, 312 from the first wireless device 202. The third wireless device 206 then re-transmits 320 Data-2. Since the third wireless device 206 is re-transmitting packet Data-2 at the same time as the first wireless device 202, both signals are in-phase and reinforce each other to increase a Data-2 packet signal strength received by the second wireless device 204 antenna and receiver circuits.

Since the signal path length 216 from the third wireless device 206 is much shorter compared with signal path length 212 from the first wireless device 202, the Data-2 packet received from the third wireless device 206 by the second wireless device 204 is much stronger. Both signals are then combined by the second wireless device's 204 single antenna and/or single receiver circuits and thus communication between the first wireless device 202 and the second wireless device 204 is more robust.

In some example embodiments, transmission and re-transmission is done using a broadcast protocol where the transmitting/re-transmitting devices do not necessarily know which other device the data packet is to be used by. Depending upon an application, re-transmission of data packets can occur: for every data packet received; only if the data packet received by the wireless device 202, 204, 206 is for a different wireless device 202, 204, 206; or if the data packet received is for more than one of the wireless devices 202, 204, 206.

The wireless device 202, 204, 206 re-transmitting the data packet is configured to detect the timing intervals 314, 316 between data packet transmissions 306, 308, 310, 312 used to transmit the data packets and then re-transmit 318, 320 data packet Data-1 or Data-2 in synchronization with the time between data packet transmissions 306, 308, 310, 312.

As discussed above, since both the transmitted and re-transmitted data packets are in-phase, the signals received by any of the devices 202, 204, 206 are summed by their single antenna and/or receiver circuits, and robustness is improved.

In contrast, signals that are not substantially in-phase (e.g. plane wave RF radiating signals) when received over different path lengths can have a random delay between them, thereby preventing single antenna and/or single receiver circuit signal summing of transmitted and re-transmitted signals. In such and RF system, the re-transmitted data packet signals would be essentially noise and thus make reception of the data packets harder.

For NF-EMI signals operating with antennas with much smaller dimensions as the wavelength and operating at a wavelength much larger than a person's height, any phase difference between signals received from different sources is very small.

For example, a person's height is 2 meters while the transmission wavelength is 30 meters (10 MHz). The phase difference can only be 360 times 2/30=24 degrees, and this only if the path length difference is 2 meter. In more realistic cases the path length difference will be 1 meter resulting in a phase difference of only 12 degrees.

Figure 4:
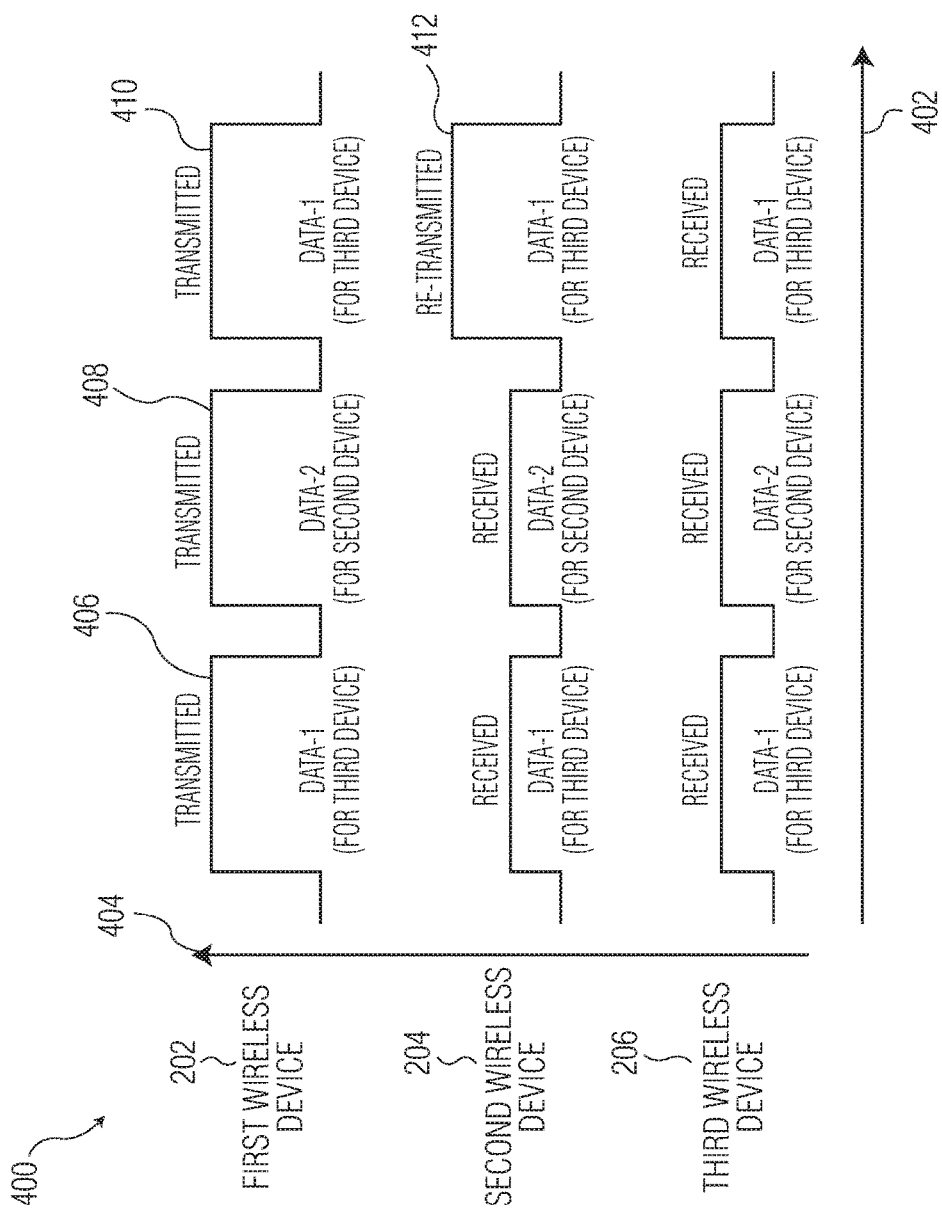
FIG. 4 is a second example signal strength and timing diagram of data packets being communicated between the set of wireless network devices.

FIG. 4 is a second example 400 signal strength and timing diagram of data packets being communicated between the set of wireless network devices 202, 204, 206. The second example 400 shows a time axis 402 and a signal strength axis 404. Data-1 transmissions for the third wireless device 206, and Data-2 transmissions for the second wireless device 204 are also shown. The example 400 shows the first wireless device 202 generating a first transmission 406, a second transmission 408, and a third transmission 410.

FIG. 4 presents a scenario where a configuration of a body network is known, and fewer or just perhaps one wireless device needs to be configured to perform re-transmission. In the example of FIG. 4, only the third wireless device 206 is less robust. So while re-transmission of packet Data-2 (right audio) to second wireless device 204 is not required, re-transmission 412 of packet Data-1 (left audio) to third wireless device 206 is required. Thus in some example embodiments, fewer than all (or just one) of the wireless devices 202, 204, 206 need to be configured for signal re-transmission.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transient computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transient machine or computer-usable media or mediums as defined herein excludes signals, but such media or mediums may be capable of receiving and processing information from signals and/or other transient mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A wireless network device, comprising:
wherein the wireless device is a second wireless device configured to receive a set of original signal transmissions from a first wireless device;

wherein the set of original signal transmissions includes a signal for the second wireless device and a signal for a third wireless device;
wherein the second wireless device is configured to detect a timing interval between individual signal transmissions within the set of original signal transmissions;
wherein the second wireless device is configured to re-transmit the signal for the third wireless device substantially in-phase with the timing interval.

2. The device of claim 1:
wherein the second wireless device is configured to also receive a re-transmitted version of the signal for the second wireless device directly from the third wireless device and substantially in-phase with the timing interval.

3. The device of claim 2:
wherein the second wireless device is configured to sum the signals for the second wireless device received from both the first wireless device and the third wireless device.

4. The device of claim 3:
wherein the signals received from the first wireless device and the third wireless device have different signal path lengths.

5. The device of claim 3:
wherein the signals received from the first wireless device and the third wireless device have different signal strengths.

6. The device of claim 3:
wherein the signal strengths of the signals received from the first wireless device and the third wireless device reinforce each other since the signals are substantially in-phase with each other.

7. The device of claim 3:
wherein the second wireless device is configured to sum the signals using only one receiver.

8. The device of claim 3:
wherein the second wireless device is configured to sum the signals using only one antenna.

9. The device of claim 3:
wherein the second wireless device is configured to sum the signals by summing a signal strength of each the signals independent of the signals phase relationship.

10. The device of claim 1:
wherein the first, second and third wireless devices together form a body area network.

11. The device of claim 1:
wherein the second wireless device is embedded in at least one of: an earbud, a hearing aid, a wearable device, a smartphone, a laptop computer, or a smartwatch.

12. The device of claim 1:
wherein the signals received from both the first wireless device and the third wireless device carry a same set of data for the second wireless device.

13. The device of claim 12:
wherein the second wireless device is configured to decode the summed signals to obtain the set of data.

14. The device of claim 12:
wherein the set of data includes at least one of: audio data, video data, sensor data, media data, document data, text data, or road traffic data.

15. The device of claim 1:
wherein the re-transmission of the signal for the third wireless device occurs even if no errors are detected in the original signal transmission of the signal for the third wireless device.

16. The device of claim 1:
wherein the original and re-transmitted signals are NF-EMI signals.

17. The device of claim 1:
wherein the second wireless device is configured to re-transmit all of the original signals from the first device that are not for the second wireless device.

18. The device of claim 1:
wherein the second wireless device is configured to re-transmit all of the original signals received from the first device.

19. A method of distributing instructions, stored on a non-transitory, tangible computer readable storage medium, for configuring a wireless network device, wherein the instructions include:
receiving a set of original signal transmissions from a first wireless device;
wherein the set of original signal transmissions includes a signal for a second wireless device and a signal for a third wireless device;
the second wireless device for detecting a timing interval between individual signal transmissions within the set of original signal transmissions; and
the second wireless device for re-transmitting the signal for the third wireless device substantially in-phase with the timing interval.

* * * * *